United States Patent
Yu et al.

(10) Patent No.: US 9,577,533 B2
(45) Date of Patent: Feb. 21, 2017

(54) CONTROL CIRCUIT FOR AN INTERLEAVED SWITCHING POWER SUPPLY

(71) Applicant: Silergy Semiconductor Technology (Hangzhou) LTD, Hangzhou, ZheJiang Province (CN)

(72) Inventors: Feng Yu, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 191 days.

(21) Appl. No.: 14/488,405

(22) Filed: Sep. 17, 2014

(65) Prior Publication Data

US 2015/0077073 A1    Mar. 19, 2015

(30) Foreign Application Priority Data

Sep. 18, 2013 (CN) .......................... 2013 1 0432481

(51) Int. Cl.
*H02M 3/158* (2006.01)
*H02M 1/14* (2006.01)
*H02M 1/00* (2006.01)

(52) U.S. Cl.
CPC ............. *H02M 3/1584* (2013.01); *H02M 1/14* (2013.01); *H02M 2001/0025* (2013.01); *H02M 2003/1586* (2013.01)

(58) Field of Classification Search
CPC .................. H02M 1/14; H02M 3/1584; H02M 2003/1586
See application file for complete search history.

(56) References Cited

U.S. PATENT DOCUMENTS

| 7,012,411 B2 | 3/2006 | Yasukouchi |
| 8,482,948 B2 | 7/2013 | Chen |
| 8,587,968 B2 | 11/2013 | Zhu et al. |
| 8,729,819 B2 | 5/2014 | Zhao et al. |

(Continued)

FOREIGN PATENT DOCUMENTS

CN    102707757 A    10/2012

OTHER PUBLICATIONS

Bing Yuan, "Implementation of High Stability with On-chip Frequency Compensation in A Current Mode DC-DC Converter", Journal of XiDian University, Aug. 2008, pp. 685-690, vol. 35-4.

*Primary Examiner* — Timothy J Dole
*Assistant Examiner* — Ishrat Jamali
(74) *Attorney, Agent, or Firm* — Michael C. Stephens, Jr.

(57) ABSTRACT

In one embodiment, a control circuit configured for an interleaved switching power supply having first and second voltage conversion circuits, can include: a feedback compensation signal generation circuit that generates a feedback compensation signal; a first power switch control circuit that activates a first on signal when a first voltage signal that represents an inductor current of the first voltage conversion circuit is less than the feedback compensation signal, a first power switch of the first voltage conversion circuit being turned on based on the first on signal, and turned off after a predetermined time; and a second power switch control circuit that activates a second on signal after half of a switching period from a rising edge of the first on signal, and a second power switch control signal to turn on a second power switch of the second voltage conversion circuit based on the second on signal.

18 Claims, 5 Drawing Sheets

(56) References Cited

U.S. PATENT DOCUMENTS

| | | | |
|---|---|---|---|
| 2002/0135338 A1* | 9/2002 | Hobrecht | H02J 1/102 |
| | | | 323/272 |
| 2013/0063102 A1* | 3/2013 | Chen | H02M 3/156 |
| | | | 323/234 |
| 2013/0148387 A1 | 6/2013 | Ren et al. | |
| 2014/0153689 A1* | 6/2014 | Anno | H05G 1/025 |
| | | | 378/4 |
| 2014/0160601 A1* | 6/2014 | Ouyang | H02M 3/158 |
| | | | 361/18 |
| 2014/0253066 A1* | 9/2014 | Teh | H02M 3/1584 |
| | | | 323/272 |

* cited by examiner

US 9,577,533 B2

CONTROL CIRCUIT FOR AN INTERLEAVED SWITCHING POWER SUPPLY

RELATED APPLICATIONS

This application claims the benefit of Chinese Patent Application No. 201310432481.9, filed on Sep. 18, 2013, which is incorporated herein by reference in its entirety.

FIELD OF THE INVENTION

The present invention relates to a switch mode power supply, and more particularly to control circuitry of an interleaved switching power supply.

BACKGROUND

Switch mode power supplies can efficiently convert electrical power from a source to a load, or to several different loads, with each corresponding to a different output. The main transistor of a switching-mode supply can switch between on and off states at a given operating frequency, and voltage regulation can be achieved by varying the ratio of the on-to-off time of the main transistor. Switch mode power supplies may have relatively high power conversion efficiency, as compared to other types of power converters. Switch mode power supplies may also be substantially smaller and lighter than a linear supply due to the smaller transformer size and weight.

SUMMARY

In one embodiment, a control circuit configured for an interleaved switching power supply having first and second voltage conversion circuits, can include: (i) a feedback compensation signal generation circuit configured to calculate and compensate an output voltage sampled at output terminals of the interleaved switching power supply, and to generate a feedback compensation signal; (ii) a first power switch control circuit configured to activate a first on signal when a first voltage signal that represents an inductor current of the first voltage conversion circuit is less than the feedback compensation signal, to activate a first power switch control signal to turn on a first power switch of the first voltage conversion circuit based on the first on signal, and to deactivate the first power switch control signal to turn off the first power switch after a predetermined time; and (iii) a second power switch control circuit configured to activate a second on signal after half of a switching period from a rising edge of the first on signal, and to activate a second power switch control signal to turn on a second power switch of the second voltage conversion circuit based on the second on signal, where the switching period comprises a time interval between a rising edges of the first on signal of previous and current switching periods.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
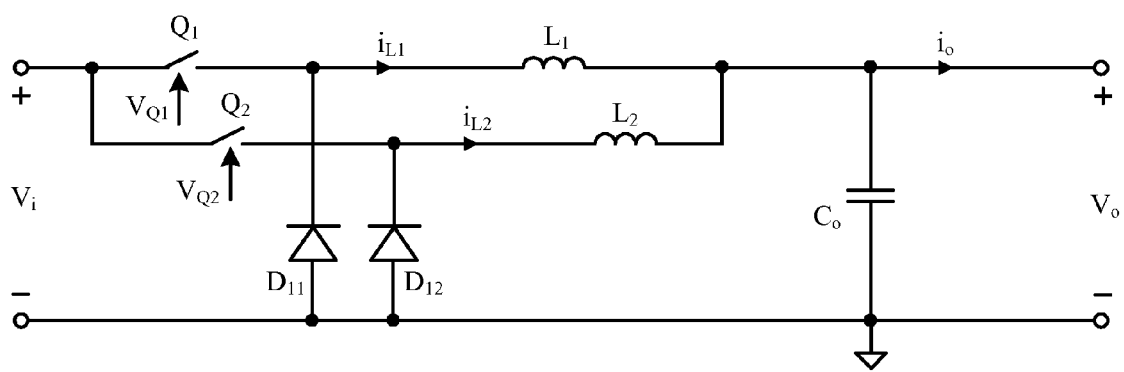
FIG. 1 is a schematic block diagram of an example interleaved buck switching power supply.

Main circuits of a switching power supply can be coupled in an "interleaved" fashion, and in parallel to decrease the burden of the power switches, to improve the power density of the power supply, and to decrease the ripple of the output voltage of the switching power supply in order to maintain a higher quality of output voltage. FIG. 1 shows an example of an interleaved switching power supply. In this example, the main circuit configuration can include two phase buck circuits coupled interleaved and in parallel, and the interleaved switching power supply can include a first voltage regulator, a second voltage regulator, and an output capacitor $C_o$. The first voltage regulator can include main power switch (e.g., a power transistor) $Q_1$, inductor $L_1$, and free-wheeling diode $D_{11}$. The second voltage regulator can include main power switch (e.g., a power transistor) $Q_2$, inductor $L_2$, and free-wheeling diode $D_{12}$. Main power switches $Q_1$ and $Q_2$ can connect to the positive electrode of input supply $V_i$, and to inductors $L_1$ and $L_2$, respectively.

Other terminals of inductor $L_1$ and inductor $L_2$ can connect to each other. For example, a first terminal of free-wheeling diode $D_{11}$ can connect to a second terminal of main power switch $Q_1$. A first terminal of free-wheeling diode $D_{12}$ can connect to a second terminal of main power switch $Q_2$. The second terminals of free-wheeling diodes $D_{11}$ and $D_{12}$ can both connect to the negative electrode of input supply $V_i$. Output capacitor $C_o$ can connect to the second terminals of inductor $L_1$ and inductor $L_2$, and to ground. The positive electrode and negative electrode of output capacitor $C_o$ can be configured as the positive electrode and negative electrode of the output terminals of the interleaved switching power supply.

In operation of the interleaved switching power supply, the conduction phase of main power switch $Q_2$ may lag that of main power switch $Q_1$ by about 180°. As such, one of power switched $Q_1$ and $Q_2$ may be on, while the other is off, thus "interleaving" the operation of the power switches. Currents $i_{L1}$ and $i_{L2}$ can be generated, and ripple waves of current $i_{L1}$ and $i_{L2}$ can be counteracted to decrease the current ripple of output current $i_o$. However, the frequency may be increased by, e.g., two times the original frequency, and the voltage ripple of output voltage $V_o$ may also be decreased. Therefore, the values of inductor $L_1$, inductor $L_2$, and output capacitor $C_o$ can be decreased to improve the dynamic response. For example, each buck circuit may only afford half of the output power, and current flowing through inductors $L_1$ and $L_2$, and power switches $Q_1$ and $Q_2$ may be only half of that of regular buck circuit. Also, in high frequency working conditions, ceramic capacitors of lower equivalent resistance can be utilized as output capacitor $C_o$ to maintain the output of the switching power supply as steadier and with higher efficiency.

Phase difference control of the interleaved switching power supply can be achieved when a constant frequency control is employed. For typical switching power supplies, better dynamic response performance and simplified compensation design can be achieved by constant time control mode. However, when the constant on time control mode is used in interleaved switching power supplies, interleaved parallel control of the two voltage regulators may be relatively difficult due to the variable operation frequency. Power switches $Q_1$ and $Q_2$ may alternately turned on by 180°, and inductor currents $i_{L1}$ and $i_{L2}$ can be superimposed to decrease significantly the ripple of output current $i_o$ and output voltage $V_o$. Each voltage conversion circuit may provide half of the output power to decrease current stress of both power switches and inductors. Further, ceramic capacitors of lower equivalent resistance can be used in the output capacitor to improve dynamic performance, stability, and/or efficiency of the switching power supply in higher frequency operation.

Control of an interleaved switching power supply can include interleaved control for the power switches (e.g., $Q_1$ and $Q_2$) of the two voltage conversion circuits. Constant frequency control and constant on time control can be employed in some cases. However, dynamic performance may suffer for constant frequency control, and interleaved control may be difficult due to the variable frequency for constant on time control. In particular embodiments, a control circuit may be applied in an interleaved switching power supply, which can utilize an interleave control mode by 180° phase differences, and can improve dynamic performance, stability, and/or efficiency of the power supply.

In one embodiment, a control circuit configured for an interleaved switching power supply having first and second voltage conversion circuits, can include: (i) a feedback compensation signal generation circuit configured to calculate and compensate an output voltage sampled at output terminals of the interleaved switching power supply, and to generate a feedback compensation signal; (ii) a first power switch control circuit configured to activate a first on signal when a first voltage signal that represents an inductor current of the first voltage conversion circuit is less than the feedback compensation signal, to activate a first power switch control signal to turn on a first power switch of the first voltage conversion circuit based on the first on signal, and to deactivate the first power switch control signal to turn off the first power switch after a predetermined time; and (iii) a second power switch control circuit configured to activate a second on signal after half of a switching period from a rising edge of the first on signal, and to activate a second power switch control signal to turn on a second power switch of the second voltage conversion circuit based on the second on signal, where the switching period comprises a time interval between a rising edges of the first on signal of previous and current switching periods.

Figure 2:
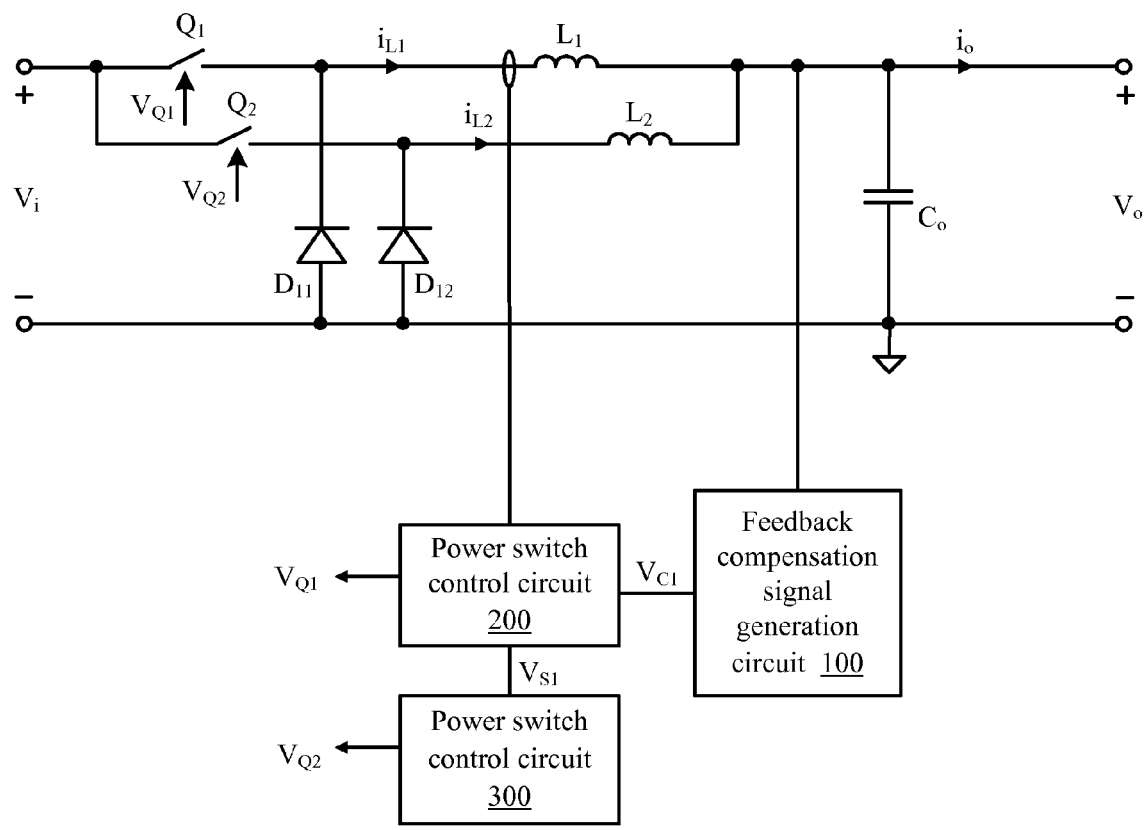
FIG. 2 is a schematic block diagram of a first example control circuit of an interleaved switching power supply, in accordance with embodiments of the present invention.

Referring now to FIG. 2, shown is a schematic block diagram of a first example control circuit of an interleaved switching power supply, in accordance with embodiments of the present invention. This example interleaved switching power supply can include a first voltage conversion circuit (e.g., including power switch $Q_1$ and inductor $L_1$) and a second voltage conversion circuit (e.g., including power switch $Q_2$ and inductor $L_2$) coupled in parallel. The control circuit can include feedback compensation signal generation circuit 100, and power switch control circuits 200 and 300.

Feedback compensation signal generation circuit 100 can generate feedback compensation signal $V_{C1}$ by calculating and compensating output voltage $V_o$ from the output terminals of the interleaved switching power supply. Power switch control circuit 200 can compare voltage signal $V_{iL1}$ that represents inductor current $i_{L1}$ of the first voltage conversion circuit against feedback compensation signal $V_{C1}$. When voltage signal $V_{iL1}$ is less than feedback compensation signal $V_{C1}$, on signal $V_{S1}$ can be activated, and switch control signal $V_{Q1}$ can be activated in accordance with on signal $V_{S1}$. When on signal $V_{S1}$ is active, switch control signal $V_{Q1}$ is active to turn on power switch $Q_1$. After power switch $Q_1$ is turned on for predetermined time $T_{on}$, switch control signal $V_{Q1}$ can go inactive to turn off power switch $Q_1$.

Power switch control circuit 300 can receive on signal $V_{S1}$ and may record moment or time point $t_1$ when the rising edge of the on signal $V_{S1}$ of a previous switching period occurs, and moment or time point $t_2$ when the rising edge of on signal $V_{S1}$ of the current switching period occurs. The time interval $(t_2-t_1)$ of these two moments/time points can be utilized as switching period T of power switches $Q_1$ and $Q_2$. Another on signal ($V_{S2}$) can be generated after half of switching period (e.g., T/2) from a rising edge of on signal $V_{S1}$. Power switch control signal $V_{Q2}$ can then be generated in accordance with on signal $V_{S2}$. When power switch control signal $V_{Q2}$ is active, power switch $Q_2$ can be turned on for predetermined time $T_{on}$, and then an off signal can be generated to make power switch control signal $V_{Q2}$ inactive in order to turn off power switch $Q_2$.

In particular embodiments, a feedback compensation signal can be generated by calculating and compensation the output voltage, which is then be compared against voltage signal $V_{iL1}$ to generate signal $V_{S1}$. Power switch control signal $V_{Q1}$ can then be generated in accordance with on signal $V_{S1}$. When on signal $V_{S1}$ is active, power switch control signal $V_{Q1}$ can be active to turn on power switch $Q_1$. Also, a switching period of the switching power supply can be generated in accordance with time $t_1$ when the rising edge of on signal $V_{S1}$ of a previous switching period occurs, and time/moment $t_2$ when a rising edge of on signal $V_{S1}$ of the current switching period occurs (that is: $T=t_2-t_1$). On signal $V_{S2}$ can be generated after half of the switch period T/2, and power switch control signal $V_{Q2}$ can be generated in accordance with $V_{S2}$. Power switch $Q_2$ can be turned on after half of switching period T/2 from the time of turning on main power switch $Q_1$. Therefore, power switches $Q_1$ and $Q_2$ can be turned on in an "interleaved" fashion. In this way, power supply control may not be influenced by the frequency of the power supply, which can improve the dynamic performance, stability, and/or efficiency of the power supply.

Figure 3:
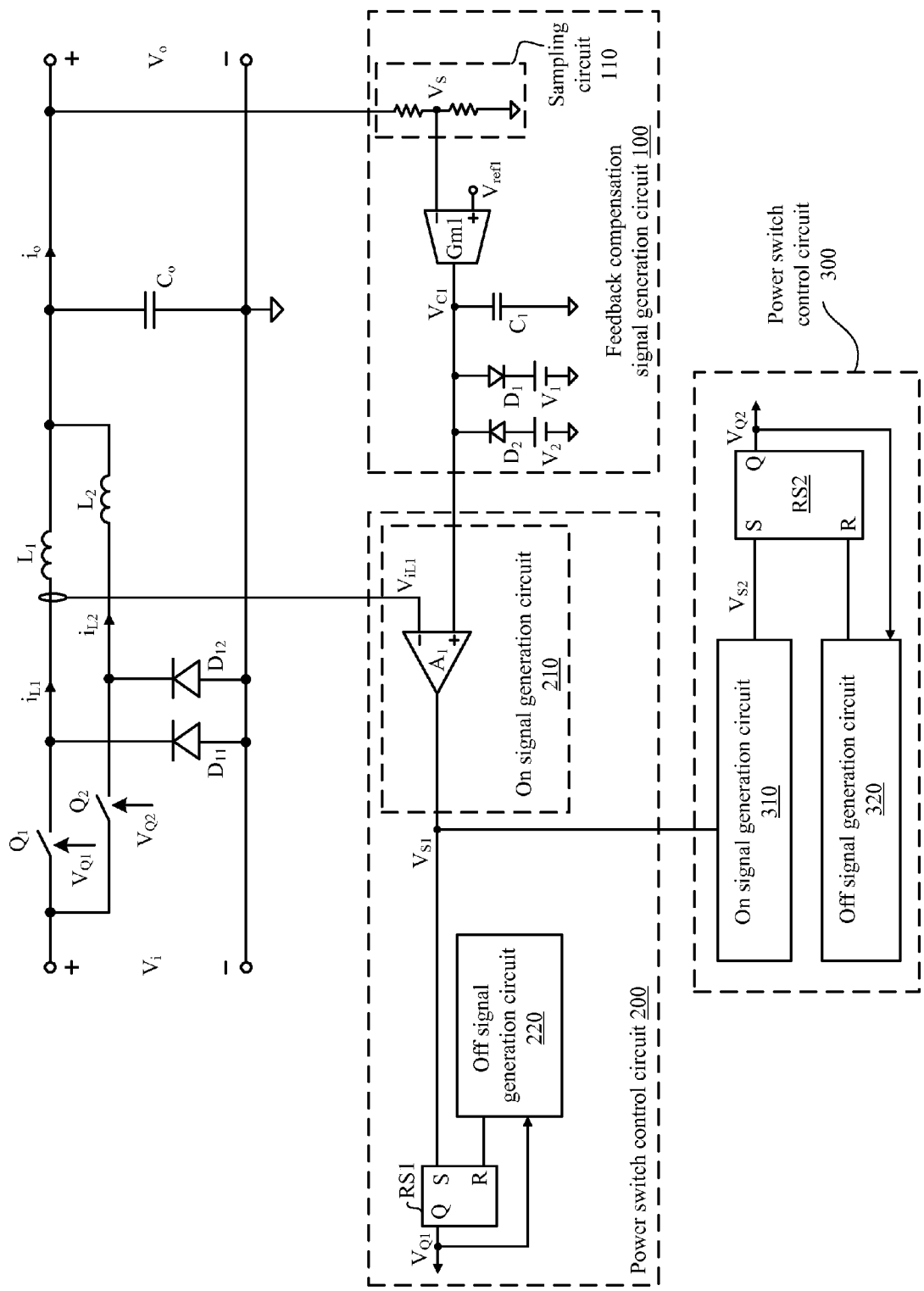
FIG. 3 is a schematic block diagram of a second example control circuit of an interleaved switching power supply, in accordance with embodiments of the present invention.

Referring now to FIG. 3, shown is a schematic block diagram of a second example control circuit of an interleaved switching power supply, in accordance with embodiments of the present invention. In this example, feedback compensation signal generation circuit 100 can include sampling circuit 110, transconductance operational amplifier Gm1, and compensation capacitor $C_1$. Sampling circuit 110 can sample output voltage $V_o$ at the output terminals of the interleaved switching power supply, and may generate voltage sampling signal $V_S$. For example, sampling circuit 110 can include two sampling resistors coupled in series, as shown. Transconductance operational amplifier Gm1 can calculate the error between reference voltage $V_{ref1}$ at the non-inverting input terminal, and voltage sampling signal $V_S$ at the inverting input terminal. Compensation capacitor $C_1$ can connect between the output terminal of transconductance operational amplifier Gm1 and ground, and may be charged by the output signal of transconductance operational amplifier Gm1. For example, a voltage across compensation capacitor $C_1$ may be employed as feedback compensation signal $V_{C1}$, which can be provided to power switch control circuit 200.

Power switch control circuit 200 can include on signal generation circuit 210, off signal generation circuit 220, and flip-flop RS1. On signal generation circuit 210 can include comparator $A_1$, the non-inverting input terminal of which can receive feedback compensation signal $V_{C1}$, the inverting input terminal of which can receive voltage signal $V_{iL1}$, and the output terminal of which can output on signal $V_{S1}$. Off signal generation circuit 220 can receive power switch control signal $V_{Q1}$. When power switch control signal $V_{Q1}$ is activated, a first timing can begin, and when the duration of the first timing reaches predetermined time $T_{on}$, a first off signal may be generated. The set terminal of flip-flop RS1 can receive power switch control signal $V_{Q1}$, the reset terminal can receive the first off signal, and the output terminal can output power switch control signal $V_{Q1}$. When on signal $V_{S1}$ is active, power switch control signal $V_{Q1}$ may be active to turn on power switch $Q_1$. When the first off signal is active, power switch control signal $V_{Q1}$ may be inactive to turn off power switch $Q_1$.

Power switch control circuit 300 can include on signal generation circuit 310, off signal generation circuit 320, and flip-flop RS2. On signal generation circuit 310 can receive on signal $V_{S1}$. On signal $V_{S2}$ may be generated after half of the switching period T/2 from the moment when the rising edge of on signal $V_{S1}$ occurs. On signal generation circuit 320 can receive power switch control signal $V_{Q2}$. When power switch control signal $V_{Q2}$ is active, a second timing may begin, and when the duration of the second timing reaches predetermined time $T_{on}$, a second off signal may be generated. The set terminal of flip-flop RS2 can receive on signal $V_{S2}$, the reset terminal of flip-flop RS2 can receive the second off signal, and the output terminal can output power switch control signal $V_{Q2}$. In this particular example, two flip-flops are employed to generate the control signals of corresponding power switch in accordance with corresponding on/off signals for interleaved operation of the two power switches. In this fashion, power supply control may not be influenced by the operating frequency, and which can improve the dynamic performance, stability, and/or efficiency of the power supply.

Figure 4:
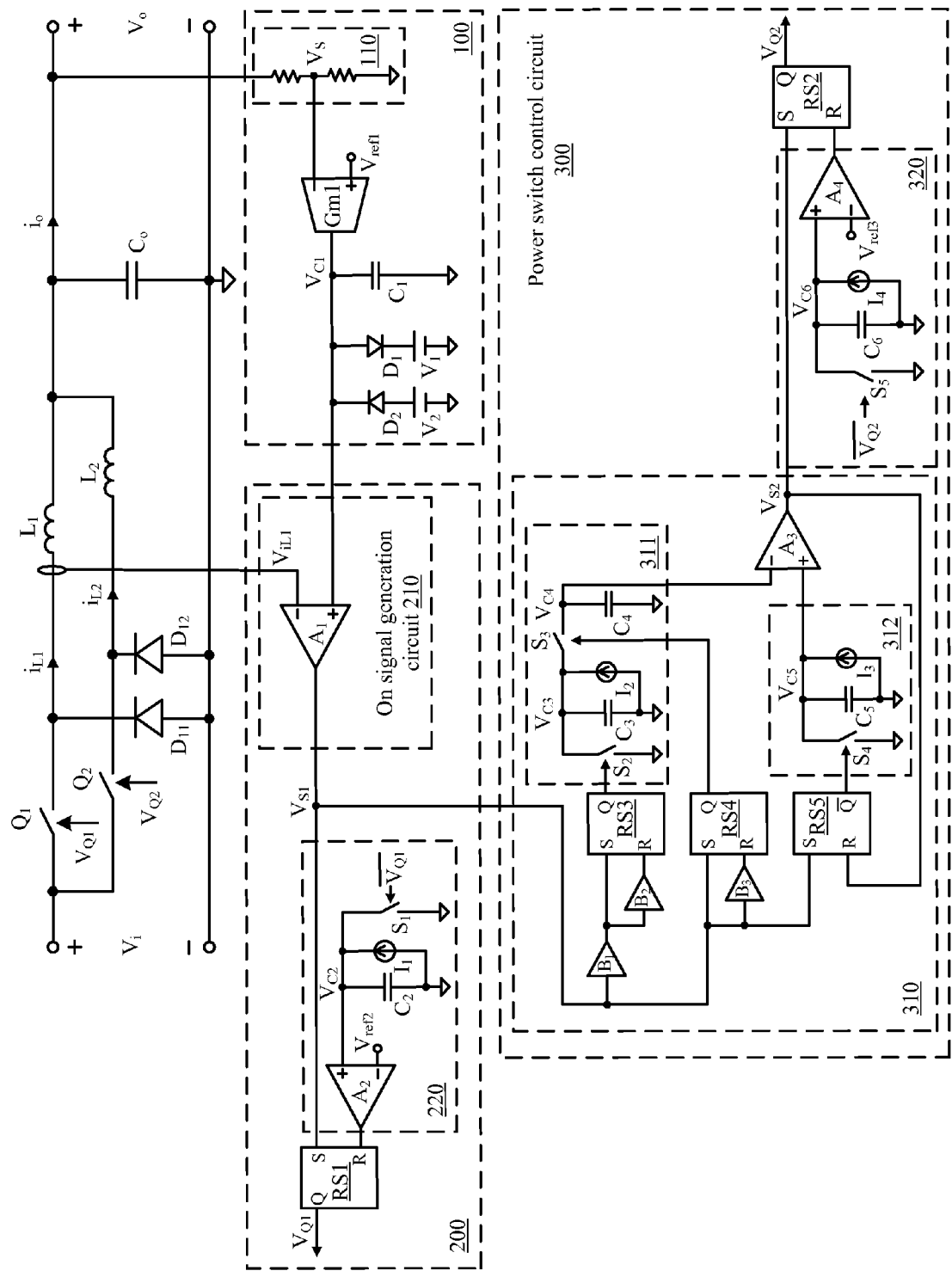
FIG. 4 is a schematic block diagram of a third example control circuit of an interleaved switching power supply, in accordance with embodiments of the present invention.

Referring now to FIG. 4, shown is a schematic block diagram of a third example control circuit of an interleaved switching power supply, in accordance with embodiments of the present invention. Off signal generation circuit 220 can include capacitor $C_2$, current source $I_1$, controllable switch $S_1$, and comparator $A_2$. Capacitor $C_2$, current source $I_1$, and controllable switch $S_1$ can be coupled in parallel, with one common node connecting to the non-inverting input terminal of comparator $A_2$, and another to ground. Both power switch $Q_1$ and controllable switch $S_1$ can be controlled by power switch control signal $V_{Q1}$. When power switch control signal $V_{Q1}$ is active, controllable switch $S_1$ may be turned off, and capacitor $C_2$ may be charged by current source $I_1$ to generate capacitor voltage $V_{C2}$. When power switch control signal $V_{Q1}$ is inactive, controllable switch $S_1$ may be turned on, and capacitor $C_2$ may be discharged through controllable switch $S_1$ until capacitor voltage $V_{C2}$ is zero.

The non-inverting input terminal of comparator $A_2$ can receive capacitor voltage $V_{C2}$, the inverting input terminal can receive reference voltage $V_{ref2}$, and the output terminal can output the first off signal. For example, a value of capacitor $C_2$ and current source $I_1$ can be set such that the time that capacitor voltage $V_{C2}$ takes to reach a level of reference voltage $V_{ref2}$ when capacitor $C_2$ is charged by current source $I_1$ may be consistent (e.g., the same, or within a predetermined amount) with predetermined time $T_{on}$. The first timing may be determined by the charging to capacitor $C_2$. Also, on signal generation circuit 310 can include buffer $B_1$, buffer $B_2$, buffer $B_3$, flip-flop RS3, flip-flop RS4, flip-flop RS5, voltage generation circuit 311, voltage generation circuit 312, and comparator $A_3$. Buffer $B_1$ can receive on signal $V_{S1}$, and may generate a first buffer signal, buffer $B_2$ can receive the first buffer signal to generate a second buffer signal, and buffer $B_3$ can receive on signal $V_{S1}$, and may generate a third buffer signal.

The set terminal of flip-flop RS3 can receive the first buffer signal, the reset terminal can receive the second buffer signal, and the output terminal can output a second controllable signal. The set terminal of flip-flop RS4 can receive the first on signal, the reset terminal can receive the third buffer signal, and the output terminal can output a third controllable signal. The set terminal of flip-flop RS5 can receive the on signal $V_{S1}$, the reset terminal can receive the on signal $V_{S2}$, and the output terminal can output a fourth control signal. Voltage generation circuit 310 can receive the second and third control signals, and may generate a fourth voltage. Voltage generation circuit 320 can receive the fourth control signal, and may generate a fifth voltage. The inverting input terminal of comparator $A_3$ can receive the fourth voltage, the non-inverting input terminal can receive the fifth voltage, and the output terminal can output on signal $V_{S2}$.

For example, voltage generation circuit 310 can include controllable switch $S_2$, controllable switch $S_3$, capacitor $C_4$, and current source $I_2$. Controllable switch $S_2$, controllable switch $S_3$, and capacitor $C_4$ can be coupled in parallel, where one common node of which can connect to a power terminal of controllable switch $S_3$, and the other common node of which can connect to ground. One terminal of capacitor $C_4$ can connect to the other power terminal of controllable switch $S_3$, and may be coupled to the inverting input terminal of comparator $A_3$, the other terminal of capacitor $C_4$ can connect to ground. Also, a voltage across capacitor $C_4$ may be configured as the fourth voltage.

Controllable switch $S_2$ may be controlled by the second control signal. When the second control signal is inactive, controllable switch $S_2$ may be off, and capacitor $C_3$ may be charged by current source $I_2$. When the second control signal is active, controllable switch $S_2$ may be on, and capacitor $C_3$ may be discharged. When controllable switch $S_2$ is turned on, capacitor voltage $V_{C3}$ across capacitor $C_3$ may have maximum value. Controllable switch $S_3$ may be controlled by the third control signal generated by flip-flop RS4. When this third control signal is active, controllable switch $S_3$ may be on to maintain voltage $V_{C4}$ as consistent with capacitor voltage $V_{C3}$. When the third control signal is inactive, controllable switch $S_3$ may be off, and voltage $V_{C4}$ can maintain the maximum value of capacitor voltage $V_{C3}$.

Voltage generation circuit 312 can include controllable switch $S_4$, capacitor $C_5$, and current source $I_3$ coupled in parallel, where one common node of which can connect to non-inverting input terminal of comparator $A_3$, and the other common node of which can connect to ground. Controllable switch $S_4$ may be controlled by the fourth control signal generated by flip-flop RS5. When the fourth control signal is inactive, controllable switch $S_4$ may be turned off, and capacitor $C_5$ may be charged by current source $I_3$. For example, a voltage across capacitor $C_5$ may be configured as the voltage $V_{C5}$. When voltage $V_{C5}$ reaches the maximum value of the capacitor voltage $V_{C3}$, the output signal of comparator $A_3$ may go high to generate on signal $V_{S2}$.

For example, the values of capacitor $C_3$ and current source $I_2$ may be set correspondingly to guarantee that the time taken for voltage $V_{C3}$ to be generated by charging capacitor $C_3$ via current source $I_2$ to reach its maximum value is consistent with switching period T of power switch $Q_1$. For voltage generation circuits 311 and 312, the value of capacitor $C_3$ may be set as twice that of the value of capacitor $C_5$, or the value of current source $I_3$ may be set as twice of the value of current source $I_2$. Therefore, the charging time of capacitor $C_3$ may be twice that of the charging time of capacitor $C_5$, and the charging time of capacitor $C_5$ may be half that of the switching period T/2. The time interval of the moment when the rising edge of on signal $V_{S1}$ occurs and the moment when the rising edge of on signal $V_{S2}$ occurs may be half that of the switching period (e.g., T/2), in order to achieve interleaved operation of main power switches $Q_1$ and $Q_2$ of the switching power supply.

Off signal generation circuit 320 can include capacitor $C_6$, current source $I_4$, controllable switch $S_5$, and comparator $A_4$. For example, capacitor $C_6$, current source $I_4$, controllable switch $S_5$, and comparator $A_4$ can be coupled in parallel, with one common node connecting to a non-inverting input terminal of comparator $A_4$, and another common node connecting to ground. Controllable switch $S_5$ may be controlled by a control signal (e.g., $V_{Q2}$) of the power switch $Q_2$. When control signal $V_{Q2}$ is active, controllable switch $S_5$ may be off, and capacitor $C_6$ may be charged by current source $I_4$ to generate capacitor voltage $V_{C6}$.

When control signal $V_{Q2}$ is inactive, controllable switch $S_5$ may be on, and capacitor $C_6$ may be discharged until capacitor voltage $V_{C6}$ decreases to zero. Comparator $A_4$ can receive capacitor voltage $V_{C6}$ at its non-inverting input terminal, and reference voltage $V_{ref3}$, and may generate the second off signal at its output terminal. For off signal generation circuit 320, capacitor $C_6$ may be charged by current source $I_4$, and values of capacitor $C_6$ and current source $I_4$ can be determined such that the time taken for capacitor voltage $V_{C6}$ to increase to a level of reference voltage $V_{ref3}$ from zero is consistent with predetermined time $T_{on}$. Therefore, the second timing may be achieved by the charging of capacitor $C_6$.

Figure 5:
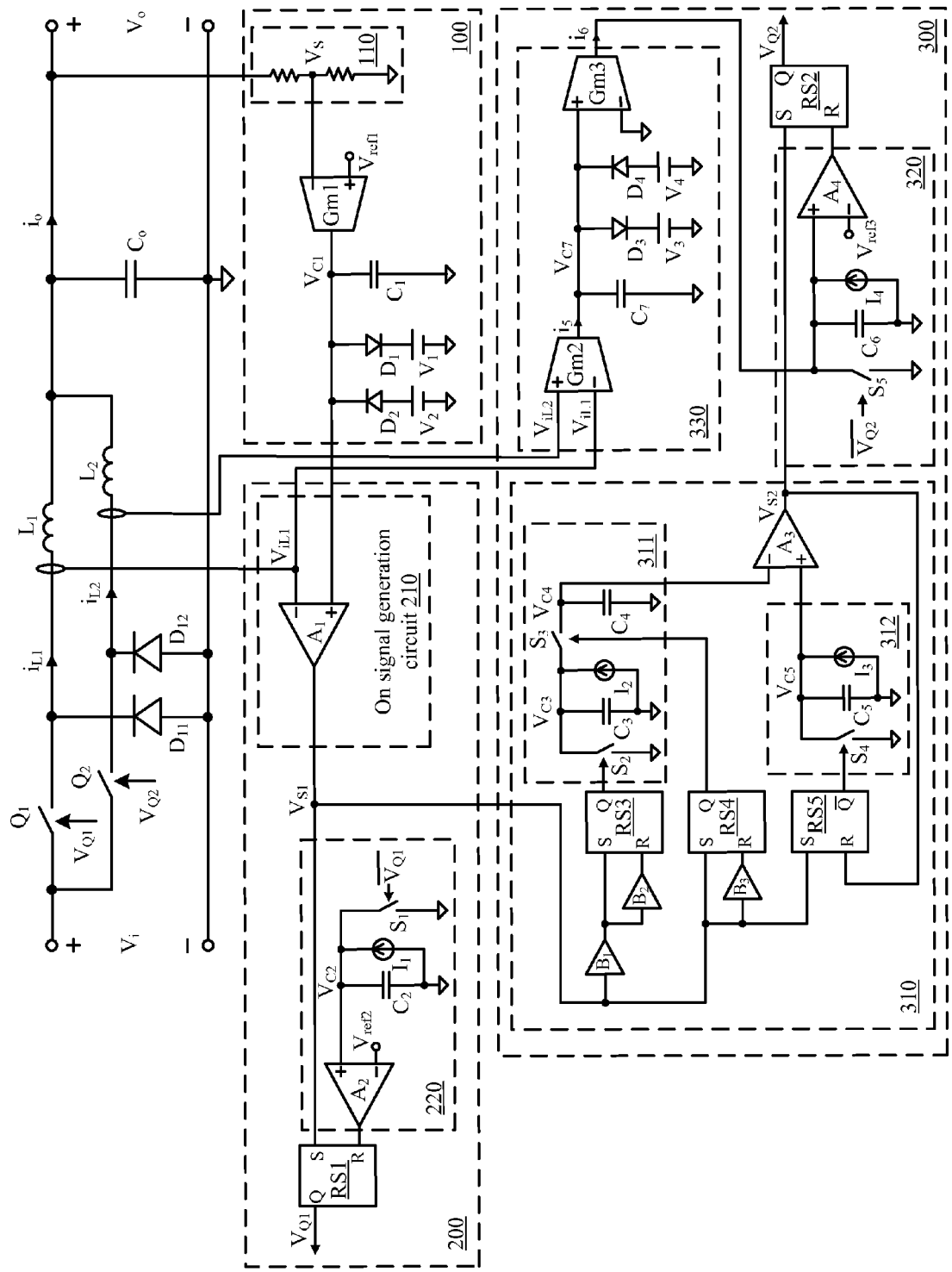
FIG. 5 is a schematic block diagram of an example interleaved switching power supply control circuit with a current sharing function, in accordance with embodiments of the present invention.

Referring now to FIG. 5, shown is a schematic block diagram of an example interleaved switching power supply control circuit with a current sharing function, in accordance with embodiments of the present invention. This example control circuit can include feedback compensation signal generation circuit 100, power switch control circuit 200, and power switch control circuit 300. Power switch control circuit 200 can include on signal generation circuit 210, off signal generation circuit 220, and RS flip-flop RS1. Power switch control circuit 300 can include on signal generation circuit 310, off signal generation circuit 320, current sharing circuit 330, and RS flip-flop RS2.

The structure and working principles of feedback compensation signal generation circuit 100, power switch control circuit 200, and on signal generation circuit 310, off signal generation circuit 320, and RS flip-flop RS2 of power switch control circuit 300 have been described above. In the particular example of FIG. 5, current sharing circuit 330 can receive voltage signals $V_{iL1}$ and $V_{iL2}$, and may generate current signal $i_6$. When controllable switch $S_5$ is off, capacitor $C_6$ may be charged by both current signal $i_6$ and current source $I_4$ to maintain inductor current $i_{L1}$ as consistent with inductor current $i_{L2}$.

For example, current sharing circuit 330 can include transconductance operational amplifier Gm2, transconductance operational amplifier Gm3, and capacitor $C_7$. Transconductance operational amplifier Gm2 can receive voltage signal $V_{iL2}$ at its non-inverting input terminal, and voltage signal $V_{iL1}$ at its inverting input terminal, and may generate current signal $i_5$ that represents an error between voltage signals $V_{iL1}$ and $V_{iL2}$. One terminal of capacitor $C_7$ can connect to the output terminal of transconductance operational amplifier Gm2, and the other terminal can connect to ground. Capacitor $C_7$ may be charged by current signal $i_5$ to generate capacitor voltage $V_{C7}$.

The non-inverting input terminal of transconductance operational amplifier Gm3 can receive capacitor voltage $V_{C7}$, and the inverting input terminal can connect to ground. The output terminal of transconductance operational amplifier Gm3 can generate current signal $i_6$. Inductor currents $i_{L1}$ and $i_{L2}$ can be compared by transconductance operational amplifier Gm2 to generate current signal $i_5$ that represents an error between inductor currents $i_{L1}$ and $I_{L2}$, and which may be employed to charge compensation capacitor $C_7$ to generate capacitor voltage $V_{C7}$. Transconductance operational amplifier Gm3 can compare capacitor voltage $V_{C7}$ and zero.

When inductor current $i_{L1}$ is consistent with inductor current $i_{L2}$, the output signal of transconductance operational amplifier Gm3 may be zero. When inductor current $i_{L1}$ is inconsistent with inductor current $i_{L2}$, current signal $i_6$ may be generated by transconductance operational amplifier Gm3, which may be provided to off signal generation circuit 320. Capacitor $C_6$ may be charged by the current signal $i_6$ and current source $I_4$. The charging time of capacitor $C_6$ may be controlled to regulate the generation time of the second off signal, as input to the reset terminal of flip-flop RS2. In this way, the on time of power switch $Q_2$ may be regulated such that inductor current $i_{L1}$ is consistent with inductor current $i_{L2}$.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A control circuit configured for an interleaved switching power supply having first and second voltage conversion circuits, the control circuit comprising:

a) a feedback compensation signal generation circuit configured to calculate and compensate an output voltage sampled at output terminals of said interleaved switching power supply, and to generate a feedback compensation signal;

b) a first power switch control circuit configured to activate a first on signal when a first voltage signal that represents an inductor current of said first voltage conversion circuit is less than said feedback compensation signal, to activate a first power switch control signal to turn on a first power switch of said first voltage conversion circuit based on said first on signal, and to deactivate said first power switch control signal to turn off said first power switch after a predetermined time from said first power switch control signal being activated has elapsed; and c) a second power switch control circuit configured to receive said first on signal, to activate a second on signal after half of a switching period from a rising edge of said first on signal, and to activate a second power switch control signal to turn on a second power switch of said second voltage conversion circuit based on said second on signal, wherein said switching period comprises a time interval between a rising edges of said first on signal of previous and current switching periods.

2. The control circuit of claim 1, wherein said feedback compensation signal generation circuit comprises:
   a) a sampling circuit configured to sample said output voltage, and to generate a voltage sampling signal;
   b) a first transconductance operational amplifier configured to determine an error between a first reference voltage and said voltage sampling signal; and
   c) a first compensation capacitor coupled between an output of said first transconductance operational amplifier and ground, wherein a voltage across said first compensation capacitor is configured as said feedback compensation signal.

3. The control circuit of claim 1, wherein said first power switch control circuit comprises:
   a) a first comparator configured to receive said feedback compensation signal and said first voltage signal, and to generate said first on signal;
   b) a first off signal generation circuit configured to activate a first off signal said predetermined time after said first power switch control signal is activated; and
   c) a first flip-flop configured to generate said first power switch control signal in response to said first on signal and said first off signal.

4. The control circuit of claim 3, wherein said first off signal generation circuit comprises:
   a) a second capacitor, a first current source, and a first controllable switch coupled in parallel, and having a common node coupled to ground;
   b) said first controllable switch being off and said second capacitor being charged by said first current source to generate a second capacitor voltage when said first power switch control signal is active, said first controllable switch being on and second capacitor voltage being discharged to zero when said first power switch control signal is inactive; and
   c) a second comparator configured to activate said first off signal in response to said second capacitor voltage and a second reference voltage, wherein a value of said second capacitor and said first current source are determined such that a time duration for said second capacitor voltage to reach a level of said second reference voltage from zero is consistent with said predetermined time.

5. The control circuit of claim 3, wherein said first off signal generation circuit is configured to receive said first power switch control signal.

6. The control circuit of claim 1, wherein said second power switch control circuit comprises:

a) a second on signal generation circuit configured to generate said second on signal after said half of said switching period from said rising edge of said first on time signal;
b) a second off signal generation circuit configured to activate a second off signal said predetermined time after said second power switch control signal is activated; and
c) a second flip-flop configured to generate said second power switch control signal based on said second on signal and said second off signal.

7. The control circuit of claim 6, wherein said second on signal generation circuit comprises:
   a) a first buffer configured to receive said first on signal, and to generate a first buffer signal;
   b) a second buffer configured to receive said first buffer signal, and to generate a second buffer signal;
   c) a third buffer configured to receive said first on signal, and to generate a third buffer signal;
   d) a third flip-flop configured to receive said first buffer signal and said second buffer signal, and to generate a second control signal;
   e) a fourth flip-flop configured to receive said first on signal and said third buffer signal, and to generate a third control signal;
   f) a fifth flip-flop configured to receive said first on signal and said second on signal, and to generate a fourth control signal;
   g) a fourth voltage generation circuit configured to receive said second and third control signals, and to generate a fourth voltage;
   h) a fifth voltage generation circuit configured to receive said fourth control signal, and to generate a fifth voltage; and
   i) a third comparator configured to receive said fourth voltage and said fifth voltage, and to generate said second on signal.

8. The control circuit of claim 7, wherein said fourth voltage generation circuit comprises:
   a) a second controllable switch, a third capacitor, and a second current source coupled in parallel, and having a first common node coupled to a third controllable switch, and a second common node coupled to ground;
   b) a fourth capacitor coupled to said third controllable switch and said third comparator, wherein a voltage across said fourth capacitor is configured as said fourth voltage;
   c) said second controllable switch being off and said third capacitor being charged by said second current source when said second control signal is active, and being on when said second control signal is inactive, wherein a voltage across said third capacitor reaches a maximum value when said second controllable switch is on, and wherein a value of said third capacitor and said second current source are determined such that a time duration for said voltage across said third capacitor to reach said maximum value is consistent with said switching period; and
   d) said third controllable switch being on to maintain said fourth voltage consistent with said voltage across said third capacitor when said third control signal is active, and said third controllable switch being off to maintain said fourth voltage as consistent with said maximum value when said third control signal is inactive.

9. The control circuit of claim 8, wherein said fifth voltage generation circuit comprises:

a) a fourth controllable switch, a fifth capacitor, and a third current source coupled in parallel and having a first common node coupled to said third comparator, and a second common node coupled to ground; and b) said fourth controllable switch being off and said fifth capacitor being charged by said third current source when said fourth control signal is inactive, wherein a voltage across said fifth capacitor is configured as said fifth voltage, and a capacitance of said third capacitor is twice of that of said fifth capacitor.

10. The control circuit of claim 6, wherein said second off signal generation circuit comprises:

a) a sixth capacitor, a fourth current source, and a fifth controllable switch coupled in parallel with a common node coupled to ground;

b) said fifth controllable switch being off and said sixth capacitor being charged by said fourth current source to generate a sixth capacitor voltage when said second power switch control signal is active, and said fifth controllable switch being on and said sixth capacitor being discharged to zero when said second power switch control signal is inactive; and c) a fourth comparator configured to receive said sixth capacitor voltage and a third reference voltage, and to generate said second off signal, wherein a value of said sixth capacitor and said fourth current source are determined such that a duration for said sixth capacitor voltage to reach a level of said third reference voltage from zero is consistent with said predetermined time.

11. The control circuit of claim 10, wherein said second power switch control circuit comprises a current sharing circuit configured to generate a sixth current signal in accordance with said first voltage signal and a second voltage signal, and wherein said sixth current signal is configured to charge said sixth capacitor when said fifth controllable switch is off.

12. The control circuit of claim 11, wherein said current sharing circuit comprises:

a) a second transconductance operational amplifier configured to generate a fifth current signal based on said first and second voltage signals;

b) a seventh capacitor coupled to said second transconductance operational amplifier and ground, wherein said seventh capacitor is configured to be charged by said fifth current signal to generate a seventh capacitor voltage; and c) a third transconductance operational amplifier configured to generate said sixth current source based on said seventh capacitor voltage.

13. The control circuit of claim 6, wherein said second off signal generation circuit is configured to receive said second power switch control signal.

14. The control circuit of claim 1, wherein said second power switch control circuit is configured to activate said second on signal without receiving a signal that represents an inductor current of said second voltage conversion circuit.

15. The control circuit of claim 1, wherein said second on signal generation circuit comprises a plurality of buffers and a plurality of flip-flops.

16. The control circuit of claim 1, wherein said second power switch control circuit comprises a current sharing circuit configured to generate a current signal in accordance with said first voltage signal and a second voltage signal, wherein said second voltage signal represents an inductor current of said second voltage conversion circuit.

17. The control circuit of claim 16, wherein said current signal is used to deactivate said second power switch control signal to turn off a second power switch.

18. The control circuit of claim 16, wherein said current signal is not used to generate said second turn on signal.

* * * * *